Oct. 25, 1955  R. J. MAGRI, JR., ET AL  2,721,793
METHOD OF BENEFICIATING FERRO-TITANIFEROUS ORES
Filed Jan. 8, 1954  2 Sheets-Sheet 1

INVENTORS
RALPH J. MAGRI &
CARROLL W. SIEBER,
BY
ATTORNEY

United States Patent Office 2,721,793
Patented Oct. 25, 1955

2,721,793

METHOD OF BENEFICIATING FERRO-TITANIFEROUS ORES

Ralph J. Magri, Jr., Lynchburg, and Carroll W. Sieber, Amherst, Va., assignors to American Cyanamid Company, New York, N. Y., a corporation of Maine Application January 8, 1954, Serial No. 403,015

11 Claims. (Cl. 75—30)

The present invention relates to the beneficiation of titaniferous ores containing substantial amounts of combined iron. More particularly, the present invention relates to the beneficiation of ferro-titaniferous ores containing more than about 10% by weight of combined iron calculated as FeO by reducing a substantial proportion of the combined iron to elementary iron at a temperature between about 1800° F. and the flow point of the reduced titaniferous phase of the ore in the presence of sufficient of a boron compound to form a fluid iron-boron composition or alloy from the elementary iron thus produced. The invention includes the use of a small amount of a phosphorus compound as assistant for the boron compound in decreasing the flow point or viscosity of the iron.

Mineralogically, ferro-titaniferous ores consist principally of intimate admixtures of ferro-titanium, calcium titanium, magnesium titanium, and aluminum titanium compounds and iron oxides. Generally, the iron oxides are present in the form of extremely thin plates, also called "lenses" or "stringers," sandwiched between similar plates of the aforementioned titanium compounds, hereinafter termed the "titaniferous phase" of the ore.

In the past these ores have been treated by heating the same in finely-divided form with coal or coke to reduce a substantial amount of the combined iron to elementary iron. The flow point of the titaniferous phase after this reduction has taken place, hereinafter termed the "reduced titaniferous phase," is substantially the same as that of the elementary iron obtained. In view of the intimate association of the iron oxides with the titania values as described, removal of iron from these ores on an industrial scale has required that the entire charge be heated above the flow point of the reduced titaniferous phase, this amount of heating being required to cause the elementary iron formed to flow from the ore particles. In practice, it has been necessary to heat the mixture so that the reduced titaniferous phase becomes a mobile liquid and, therefore, temperatures in the range of about 2800–3000° F. have been commonly employed. Under these conditions the elementary iron collects as a pool at the bottom of the smelting vessel and the molten reduced titaniferous phase floats on the top.

The reduced titaniferous phase, as its name implies, contains a substantial amount of reduced or trivalent titanium, generally termed "reduced titania." This material causes the flow point of the phase to rise very markedly, and to maintain the flow point of this phase within the thermal range of the electric furnaces employed, it is customary to add basic fluxes such as calcium and magnesium oxides so as to maintain the titaniferous phase as a mobile liquid at about 2800°–3000° F. as described.

The manufacture of titaniferous slags by the method referred to is disclosed in Peirce et al. Patent No. 2,476,453, and Cole U. S. Patent No. 2,631,941.

The separation of iron from a ferro-titaniferous ore by any process which requires complete liquefaction of both phases of the ore is disadvantageous for the following principal reasons:

1. The process can be carried out effectively only in an electric furnace, and therefore can be performed only in localities which are adjacent to an ample and cheap source of electric power.
2. Molten titania slags are very corrosive to electric furnace linings.
3. As the reduced titania content of the titaniferous phase of the melt increases, both the melting point and the viscosity of this phase rise to a point where this phase cannot be poured. To reduce the viscosity of this phase, the addition of basic fluxing agents becomes necessary. This, however, sets a limit upon the maximum titanium content of the titaniferous phase.

The present invention is based upon the concept of combining the elementary iron formed by reduction of the combined iron in ferro-titaniferous ores with boron so as to form an iron-boron composition or alloy having a flow point below the flow point of the titaniferous phase of the ore. The invention is further based upon the concept of maintaining the maximum temperature of the reduction at a temperature between the flow point of the iron-boron composition thus formed and the flow point of the titaniferous phase of the ore until flow of the iron-boron composition has substantially ceased.

The discovery has now been made that ferro-titaniferous ores can be beneficiated at comparatively low temperatures by reducing a substantial proportion of the combined iron in the ore to elementary iron in the presence of sufficient of a boron compound to form from the elementary iron thus obtained an iron-boron composition having a flow point below the flow point of the reduced titaniferous phase of the ore, the charge being maintained during the beneficiation at a temperature between the flow point of the iron-boron composition and the flow point of the titaniferous phase until flow of the iron-boron composition from the ore has substantially ceased.

We have found that the effect of the boron compound is to decrease the flow point or the viscosity of the elementary iron formed so that a very large part of this iron flows from the ore and coalesces into spheroids or a pool which are easily removed from the titaniferous phase by simple physical means.

Briefly, according to the present invention, a ferro-titaniferous ore is mixed with a carbonaceous reducing agent and a small amount of a boron compound. If desired, a small amount of a phosphorus compound may be added. The mixture is heated close to but below the flow point of the titaniferous phase of the ore until the combined iron in the ore is reduced to the elementary state and flow thereof has substantially ceased. A substantial portion of the iron is entrained in the titaniferous phase in the form spheroids, and under certain circumstances a part of the iron may collect as a pool underlying the charge. The larger entrained iron spheroids are separated from the titaniferous phase by purely physical means such as crushing or grinding the phase followed by sieving, air classification, magnetic separation, etc. If desired, the smaller spheroids are removed chemically by leaching the product with dilute acid.

We have further found it possible to remove up to about 75% of the iron originally present in the ore by the physical means referred to, and practically 100% of the iron can be removed when acid leaching is employed.

We have further found that after removal of all or part of the iron, the titaniferous phase contains close to the maximum amount of titanium theoretically possible and that this material digests readily with strong sulfuric acid to form titanium sulfate, and intermediate in the process of recovering titania values therefrom.

We have further found that phosphorus compounds act as assistants for the boron compounds in decreasing the flow point or the viscosity of the elementary iron formed.

It is an outstanding feature of the present invention that no basic fluxes are required and that substantially all of the boron compound and any phosphorus compound added (except the part which volatizes during heating) reports in the elementary iron. As a result, the process of the present invention does not require the introduction of any material capable of contaminating the titaniferous phase with chemically undesirable impurities or with impurities which tend to decrease the proportion of titanium in the phase.

It is a further feature of the present invention that the amount of boron added and the temperature may be, in numerous instances, so controlled as to insure that substantially all of the iron composition formed is retained in the titaniferous phase in the form of spheroids of appreciable size. The spheroids typically contain about 0.01% to about 1% of boron, about 0.02% to 2% of carbon, about 0.01% to 0.1% of titanium, and traces of other elements present in the ore, including silicon and manganese, the remainder being iron. When a phosphorus compound is added the spheroids may contain up to 3.5% by weight of phosphorus.

As stated, these spheroids may be recovered in large part by grinding the ore followed by screening. We have found that the spheroids are extremely hard and are, therefore, valuable for shot peening.

The process of the present invention has the following additional advantages:

1. The temperatures required are so low that the process may be performed in an ordinary oil-fired horizontal rotating kiln. As a result, beneficiation of the ore is freed from dependence upon low cost electric power.

2. The temperatures required are so low that they are within the range in which ordinary fire clay refractories may safely be used. As a result, the intense corrosion of refractory surfaces which takes place when ferro-titaniferous ores are smelted in electric furnaces does not take place.

3. The titania values in the product can be recovered in high yields by digestion with strong sulfuric acid in known manner.

4. The process of the present invention is usefully employed with any of the known ferro-titaniferous ores containing more than about 10% by weight of the combined iron calculated as FeO, the treatment of ores containing less than this amount not being economic. In general, the invention finds its greatest utility in connection with ilmenite, arizonite, Trail Ridge ores which contain substantial amounts of both iron and titanium and these typically contain from about 30% to 85% of titanium calculated as $TiO_2$, and from about 40% to 10% of iron calculated as FeO.

According to the present invention, a furnace charge is prepared usually consisting essentially of the ore and the carbonaceous reducing agent. To this is added a small amount of a boron compound and, if desired, a small amount of a phosphorus compound, and the mixture is heated to a temperature between the flow point of the iron-boron composition formed and the flow point of the titaniferous phase of the ore. This temperature varies depending principally on the type of the ore and the amount of the boron compound added, and can readily be determined by withdrawing samples from time to time during the heating and observing the samples for iron spheroids. The minimum temperature is obtained when a substantial part, that is, at least one-third of the iron in the ore has been reduced and has coalesced into spheroids larger than about 325 mesh in size. The maximum temperature is the flow point of the titaniferous phase and this can readily be determined by simple observation of the charge.

In practice, we have found that the amount of heat required can be decreased by performing the operation in two steps. In the first step, the charge is first brought to a low reduction temperature and is maintained there until the reduction is largely complete. The temperature of the charge is then raised to above the flow point of the iron-boron composition for a comparatively brief period of time for the purpose of causing the composition to flow from the ore and coalesce into bodies of desired size.

Typically, the first step is performed at about 1900°–2150° F., this being above the minimum effective temperature for speedy reduction. The time required for this step can readily be determined by removing samples periodically and examining them microscopically. The metallic iron formed is distinctly different in appearance from the combined iron present, and the reduction is largely completed when the rate of formation of metallic iron slows markedly.

Typically, the second step is performed at a temperature of about 2250°–2350° F. and the charge is maintained at this temperature at least until about one-third of the iron has coalesced into aggregates larger than about 325 mesh. This period of heating is considered complete when examination of the samples withdrawn shows that formation of spheroids or a pool of iron has substantially ceased.

When the flow of the iron-boron or iron-boron-phosphorus composition has substantially ceased as described, any pool of iron present is tapped off and the titaniferous phase is removed. The manner in which the titaniferous phase is removed, cooled and further processed to separate iron therefrom plays no part in the present invention. Advantageously, however, the titaniferous phase may be crushed in a ball mill or a rod mill and the mill discharge screened successively through a 48 mesh and a 200 mesh screen. The screen oversize consists very largely of iron spheroids. The —200 mesh fines are then ball-milled in accordance with Todd et al. U. S. Patent No. 2,531,926 to reduce them to the particle size range in which they most efficiently react with strong sulfuric acid. If desired, before the digestion the finely ground fines may be leached with dilute sulfuric acid to remove the very small spheroids which passed through the screen. The leached product contains only about 5% by weight of iron calculated as FeO, which is substantially lower than the iron content of slags produced commercially at the present time. The leached material is then digested with strong sulfuric acid in the normal manner, for example, according to the Todd et al. U. S. patent referred to.

The step of reducing the combined iron in ferro-titaniferous ores to metallic iron is well known in the art, and the precise method employed, together with the precise amount of combined iron reduced therefore plays no part in the present invention. Normally the amount of reducing agent supplied is controlled so as to ensure that the titaniferous phase contains between about 1% and 10% by weight of combined iron calculated as FeO, and this practice may, but need not, be followed in performing the process of the present invention.

Any of the common boron compositions may be employed, including borax, boron oxide, boric acid, the alkali and earth metal metaborates and tetraborates, lead metaborate, and the alkali metal borofluorides. Moreover, a mixture of calcium fluoride and boric acid may be used. Further, any naturally occurring boron compound may be employed, including rasorite, colemanite, kernite, priceite, boracite, warwickite, and sassolite. The invention includes the use of volatile boron compounds such as boron trifluoride where the reaction takes place in a closed vessel.

The amount of boron compound which should be added varies principally with the amount of elementary iron formed by the carbonaceous agent and the temperature to which the reaction mixture is heated. Since the boron compounds themselves volatilize slowly at reduction temperatures and since boron contained in iron volatilizes slowly therefrom, particularly when the iron is in molten condition, it also depends upon the rate at which the reaction mixture is heated and the duration at which the charge is maintained at temperatures at which both types of volatilization takes place. Ordinarily, the addition of from 0.5% to 5% of boron compound (calculated as B and based on the weight of the iron content of the ore, calculated as Fe), has been found to give satisfactory results, ensuring that a large amount of the iron forms as a pool or as larger spheroids or both.

The most effective amount of boron which should be added can best be determined by making a series of laboratory trials and determining the average diameter of the iron spheroids present in the titaniferous phase. The optimum amount of boron is that which produces spheroids of the largest average diameter.

The amount of boron in the spheroids may be as little as 0.01% or less of boron depending on the length of time the charge is maintained at high temperatures. The amount of boron in the spheroids may be considerably more, but the presence of more than 0.5–1% of boron in the spheroids appears to be without material advantage in terms of the size of the spheroids or total amount of iron recovered.

The evidence is that very good results are obtained when the amount of boron added is correlated with the heating cycle to form spheroids containing an intermediate amount of boron, that is, between about 0.1% and 0.3% of boron calculated as B, this amount causing a very high percentage of the iron to be exuded from the ore and to coalesce into well-formed spheroids of large size within the titaniferous phase of the ore while minimizing the amount of boron required.

The iron produced by the process may advantageously also contain a somewhat higher amount of boron, that is, between about 0.5% and 1% of boron calculated in the same manner. With this amount of boron present, a large part and frequently nearly all of the iron formed coalesces as a pool which can readily be tapped off. The use of the additional amount of boron in this manner is thus compensated for by the increased ease with which the iron can be separated.

The effect of the boron as fluidifier or viscosity reducing agent is assisted by the presence of a small amount of a phosphorus compound. Any of the common phosphate-containing materials may be used for this purpose. Suitable materials include the alkali metal orthophosphates, metaphosphates and pyrophosphates, and the corresponding alkali earth metal phosphates. Apatite ore, commercial phosphates, and super phosphate fertilizers are suitable also. In addition, boron phosphate may be employed as a source both of boron and of phosphorus.

The action of the phosphorus is usually to increase somewhat the amount of iron separated from the ore and to decrease, often by as much as 25%, the amount of boron necessary to separate any given amount of iron. The addition of as little as 0.1% of phosphorus based on the weight of the iron content of the ore is effective in this regard, and hence there does not appear to be any minimum amount of phosphorus which does not produce at least some beneficial effect. Much more phosphorus may be employed, but the addition of more than is necessary to produce an iron containing more than 3.5% by weight of phosphorus causes the flow point of the titaniferous phase of the ore to fall unduly without conferring any corresponding benefit.

In practice, when a phosphorus-containing compound is added, we prefer to add sufficient of the phosphorus compound to form an iron-boron-phosphorus composition containing between about 1.5% to 2.5% of phosphorus, this amount of phosphorus usually permitting the amount of boron to be decreased by about 15%–25% from the values set forth above.

The practice of a preferred embodiment of the present invention is illustrated by the drawings in which.

Figure 3:
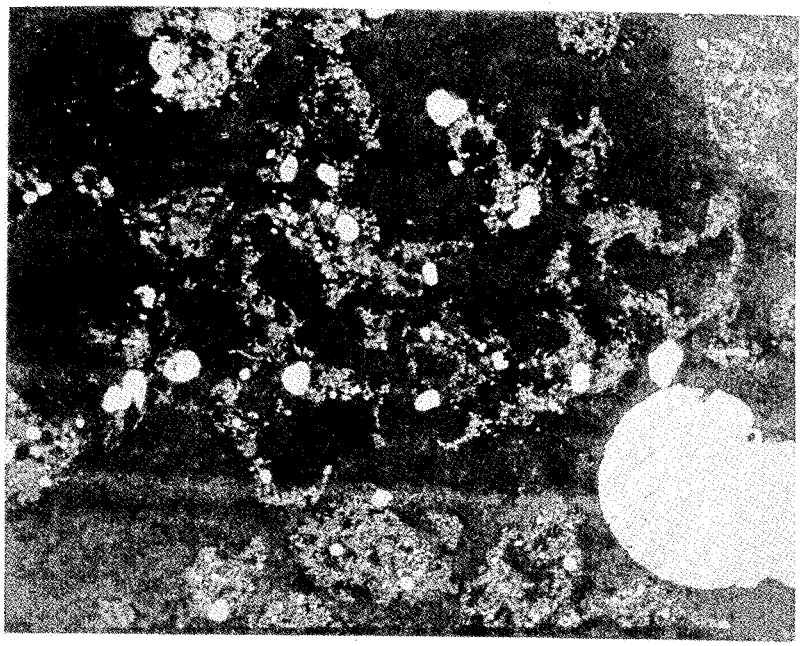
Figure 4:
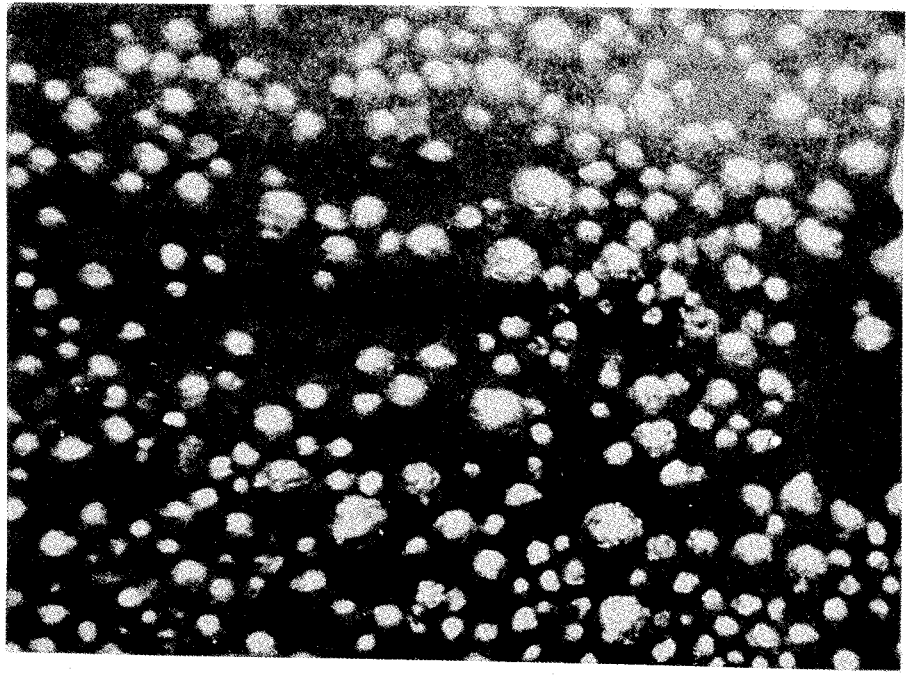

Figure 3 is a photomicrograph at 80 × of ilmenite ore which had been heated at 2350° F. with 4% of boron as boric acid, based on the weight of the iron therein, and with sufficient petroleum coke to cause substantially all of the iron content of the ore to be reduced to metallic form, and lightly crushed with a spatula; and Figure 4 is a photomicrograph at 16 × of the +100 mesh spheroids removed from the material of Figure 3.

Figure 1:
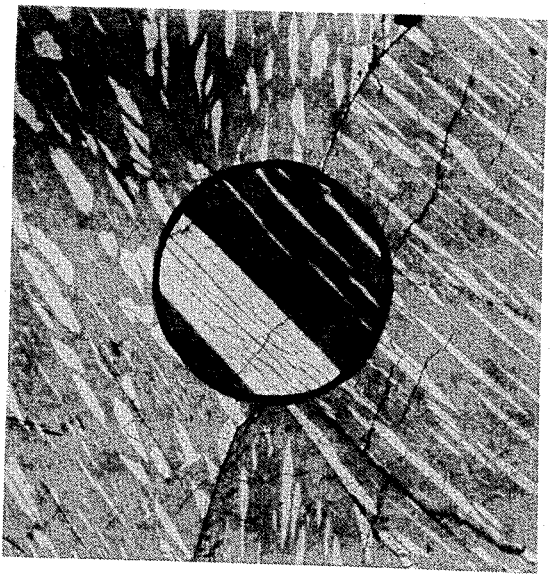
Figure 1 is a photomicrograph at 100 × of a polished sample of ilmenite ore suitable for use according to the process of the present invention. The figure contains an insert showing one area of the figure magnified to 1000 ×.

In Figure 1, the light grey areas represent hematite or other iron oxide, while the dark grey areas represent the titaniferous portions of the ore. The larger formations are about 2 microns in thickness. From the insert it will be seen that hematite plate contain sub-plates of titaniferous material, and that the titaniferous portion contains sub-plates of hematite or other iron oxides.

Figure 2:
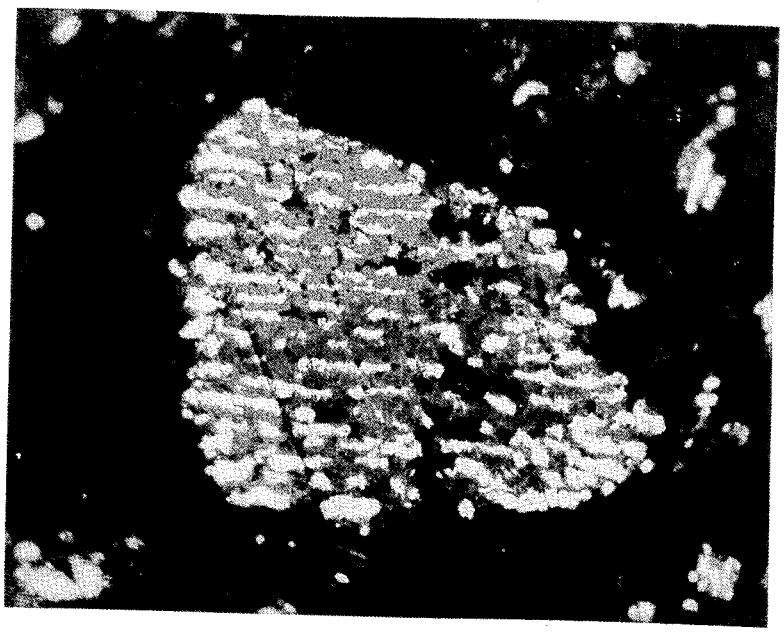
Figure 2 is a photomicrograph at 500 × of ilmenite ore which had been heated at 2700° F. with sufficient petroleum coke to cause substantially all of the iron content of the ore to be reduced to metallic form.

Figure 2 shows that when an ilmenite ore corresponding to the ore of Figure 1 is heated near to but below the flow point of the titaniferous phase of the ore in the presence of a carbonaceous reducing agent, substantially all the iron (shown as white areas) is reduced to the metallic state, but that substantially none of this iron exudes from its lens-like or plate-like formations. The iron remains localized in the plate-like formations in which it was originally present.

Figure 3 shows the crude titaniferous phase of beneficiated ilmenite produced according to the process of the present invention. The white areas represent the metallic iron-boron spheroids, the dark grey areas represent the titaniferous phase, and the black areas represent pits which, prior to crushing, had been occupied by spheroids of the iron-boron composition. This figure demonstrates that substantially all of the iron in the ore coalesced into spheroids which are exposed for separation by physical means.

Figure 4 shows that the spheroids removed by ball-milling material of Figure 3 followed by screening on a 100 mesh screen have been cleanly separated and are substantially free from adherent titaniferous material.

The figures may be advantageously used as follows to determine optimum conditions in the practice of the present invention.

The amount of boron should be correlated with the temperature and rate and duration of heating to produce a substantially iron-free titaniferous phase having the appearance of the titaniferous material of Figure 3 as distinguished from the material of Figure 2. Moreover, the duration of heating should extend at least until well-formed large spheroids have developed having the appearance of those of Figures 3 and 4. Development of a product resembling that of Figure 2 demonstrates that insufficient boron or boron and phosphorus was used, that the charge was not heated to a sufficiently high temperature, or that the charge was not maintained long enough at a sufficiently high temperature.

If desired, the temperature or the amount of boron may be increased to cause the larger spheroids to coalesce to form a pool. The appearance of the titaniferous phase, however, remains substantially that shown in Figure 3, the principal difference being that the phase contains fewer iron spheroids which are smaller in diameter.

The invention will be more particularly illustrated with reference to the examples which follow, which are to be construed as embodiments of the invention and not as limitations thereon.

Example 1

400 g. of Nelson County ilmenite having the general appearance of the ilmenite of Figure 1 and having the following average composition

| | Percent |
|---|---|
| Titanium as $TiO_2$ | 45.7 |
| Divalent Fe as FeO | 39.2 |
| Trivalent Fe as $Fe_2O_3$ | 11.8 |
| Phosphorus as $P_2O_5$ | 0.07 |
| Silicon as $SiO_2$ | 0.7 |
| Total | 97.47 | was screened and the −65+150 mesh fraction retained. The fraction was mixed with a 120 g. of similarly ground calcined petroleum coke and with 52 g. of borax ($Na_2B_4O_7 \cdot 10H_2O$). The weight of the boron in the borax was 4.0% of the weight of the total iron in the ilmenite calculated as Fe.

The mixture was placed in a horizontal rotating silicon carbide laboratory calciner 4″ in diameter, which had been preheated by external electric resistance heaters to 2115° F. The calciner was sealed with silicon carbide discs so as to maintain a reducing atmosphere, and was rotated at the rate of 2 R. P. M.

The temperature of the calciner was maintained at 2100° F. for 3 hours, at the end of which time, from previous experience, it was known that the reducing action of the carbon was substantially complete. This temperature was insufficiently high to cause the ore or the elementary iron thus obtained to flow, and a sample of the ore withdrawn at the point had the general appearance of the ore shown in Figure 2.

Flow of the iron from the ore was effected by raising the temperature of the furnace to 2300° F. for 3 hours. This temperature was below the flow point of the titaniferous phase. During the heating a pool of iron formed underlying the ore. Growth of this pool was substantially complete at the end of three hours at that temperature.

The titaniferous material recovered had the general appearance of the material shown in Figure 3.

Laboratory analysis of this material showed that 94.2% of the iron present in the original ilmenite had been reduced to metallic iron.

A sample of the beneficiated ore was examined microscopically. Examination showed that substantially 100% of the metallic iron present was in the form of spheroids larger than 20 microns in diameter, the average size of the spheroids being 65 microns.

The remainder of the beneficiated ore was ground in a ball-mill. The +100 and +200 mesh fraction consisted respectively 98.9% and 93.0% of Fe calculated as FeO. These spheroids had the general appearance of the spheroids of Figure 4.

The −325 mesh fraction contained a total of 22.1% of iron by weight calculated as FeO. This fraction was leached with 20% sulfuric acid at room temperature, which removed substantially all the very small residual elementary iron spheroids present, the product containing 5.0% of iron calculated as FeO. The leached product was dried and examined by X-ray diffraction. It was found to consist essentially of titanium dititanate containing a small amount of iron dititanate. It analyzed 91.8% of titanium calculated as $TiO_2$.

The iron spheroids recovered on the +100 mesh fraction were analyzed. Results are as follows:

| Element: | Percent |
|---|---|
| Boron | 0.34 |
| Phosphorus | Nil |
| Carbon | 0.78 |
| Iron | 98.70 |
| Mn, Si, Ti, S (by diff.) | 0.18 |
| Total | 100.00 |

Example 2

The procedure of Example 1 was repeated except that the borax was replaced by an equivalent amount of anhydrous rasorite and the charge contained apatite (a calcium phosphate) in amount equivalent to 1.3% of phosphorus based on the weight of the iron content of the ilmenite.

Similar results were obtained, the principal difference being that the spheroids entrained in the titaniferous phase were larger, 79.5% by weight being larger than 200 mesh and 89.2% by weight were larger than 325 mesh.

Example 3

Manufacture of beneficiated ilmenite without formation of a pool of iron is illustrated by the following.

The procedure of Example 1 was repeated except that 27 gm. of anhydrous sodium tetraborate was added in place of the borax, and the speed of rotation of the calciner was decreased to 1 R. P. M. As a result of these changes, no pool of iron formed and all of the iron-boron composition was entrained in the titaniferous phase in the form of spheroids.

Analysis of the beneficiated ore showed that 94.2% of the total iron content of the ilmenite was reduced to elementary iron. Microscopic examination of this ore showed that all of the iron was spheroidal in shape and than 77.2% of the spheroids by weight were larger than 325 mesh.

A sample of the product was ball-milled and screened through a 325 mesh screen.

A sample of the −325 mesh fraction was leached with the dilute sulfuric acid. The iron entrained therein readily dissolved in the liquor leaving a residue that analyzed over 90% titanium calculated as $TiO_2$. The residue was washed and digested with sulfuric acid of 93% strength. The titanium yield was 91%.

Example 4

The procedure of Example 1 was repeated, except that lithium borate was used in place of borax and an ilmenite ore was used which contained apatite (a calcium phosphate). The weight of boron in the lithium borate was 3.0% of the iron content of the ore calculated as Fe, and the weight of phosphorus in the apatite was 1.3% of the iron content of the ore calculated on the same basis.

More than 95% of the iron content of the ore was reduced to the elementary state. Analysis showed that of this, 48.6% collected as a pool, and the remainder was entrained in the beneficiated ore in the form of spheroids. The weight of the iron in the pool plus the weight of the +200 mesh spheroids in the beneficiated ore was 80.0% of the total iron content of the ore.

Example 5

The use of a large amount of phosphorus is illustrated by the following.

The procedure of Example 1 was repeated using the same ore as described therein, except that the amount of borax added was decreased to an amount equivalent to 1.0% of boron based on the total iron content of the ore, and calcium phosphate was added in amount sufficient to supply 3.50% by weight of phosphorus to the reaction mixture.

The results were very good, the amount of iron separated as a pool and as spheroids larger than 325 mesh being 89.2% of the total iron of the ore. The amount of iron separated as a pool and as spheroids larger than 200 mesh was 79.5% of the total iron of the ore. The iron spheroids formed contained 1.78% of phosphorus, 0.02% of boron, and less than 1% of carbon.

The procedure was then repeated except that addition of the borax was omitted. Results were unsatisfactory. No pool of iron formed, and the amount of iron separated as spheroids larger than 200 mesh fell to 15.9%. This demonstrates that the addition of at least a small amount of boron is necessary for effective beneficiation when even a large amount of phosphorus is added.

We claim:

1. A method of beneficiating a ferro-titaniferous ore containing more than 10% by weight of combined iron calculated as FeO, which includes the steps of reducing a substantial proportion of said combined iron to elementary iron at a temperature between about 1800° F. and the higher flow point of the titaniferous phase of the ore in the presence of sufficient of a boron compound to form an iron-boron composition having a flow point within said temperature range, and maintaining the ore at a temperature between the flow point of said composition and the higher flow point of the titaniferous phase of the ore until flow of said iron-boron composition from the ore has substantially ceased.

2. A method according to claim 1 wherein the ore is an ilmenite ore.

3. A method according to claim 2 wherein the amount of boron is sufficient to form an iron-boron composition containing between about 0.1% and 0.3% by weight of boron.

4. A method according to claim 3 wherein the boron compound is borax.

5. A method of beneficiating a ferro-titaniferous ore containing more than 10% by weight of combined iron calculated as FeO, which includes the step of reducing a substantial proportion of said combined iron to elementary iron at a temperature between about 1800° F. and the higher flow point of the titaniferous phase of the ore in the presence of sufficient of a boron compound and a phosphorus compound to form an iron-boron-phosphorus composition having a flow point within said temperature range, and maintaining the ore at a temperature between the flow point of said composition and the higher flow point of the titaniferous phase of the ore until flow of said iron-boron-phosphorus composition from the ore has substantially ceased.

6. A method according to claim 5 wherein the amount of the boron compound and the phosphorus compound is sufficient to form an iron-boron-phosphorus composition containing between about 0.1% and 0.3% by weight of boron and about 1.5% to 2.0% by weight of phosphorus.

7. A method according to claim 6 wherein the phosphorus compound is a calcium phosphate.

8. A method of beneficiating an ilmenite ore containing more than 10% by weight of combined iron calculated as FeO, which includes the steps of reducing a substantial proportion of said combined iron to elementary iron at a temperature between about 1800° F. and the higher flow point of the titaniferous phase of the ore in the presence of sufficient of a boron compound to form an iron-boron composition having a flow point within said temperature range, maintaining the ore at a temperature between the flow point of said composition and the higher flow point of the titaniferous phase of the ore until flow of said composition from the ore has substantially ceased, whereby spheroids of said iron-boron composition form in said titaniferous phase, and cooling and grinding said phase and removing spheroids of said iron-boron composition therefrom.

9. A method according to claim 8 wherein the titaniferous phase is ground finer than —325 mesh before screening.

10. A method according to claim 8 wherein the spheroids are removed by leaching with dilute sulfuric acid.

11. A method of beneficiating an ilmenite ore containing more than 10% by weight of combined iron calculated as FeO, which includes the steps of reducing a substantial proportion of said combined iron to elementary iron at a temperature between about 1800° F. and the higher flow point of the titaniferous phase of the ore in the presence of sufficient of a boron compound and a phosphorus compound to form an iron-boron-phosphorus composition having a flow point within said temperature range, maintaining the ore at a temperature between the flow point of said composition and the higher flow point of the titaniferous phase of the ore until flow of said composition from the ore has substantially ceased, whereby spheroids of said iron-boron-phosphorus composition form in said titaniferous phase, cooling said phase, grinding and screening said phase to remove spheroids of said iron-boron-phosphorus composition therefrom as screen oversize, and leaching the screen undersize with dilute sulfuric acid to dissolve the remainder of said iron-boron composition therefrom.

References Cited in the file of this patent

UNITED STATES PATENTS

| | | |
|---|---|---|
| 2,100,264 | Perrin | Nov. 23, 1937 |
| 2,546,936 | Vignos | Mar. 27, 1951 |
| 2,631,941 | Cole | Mar. 17, 1953 |